No. 639,619. Patented Dec. 19, 1899.
W. S. SCALES.
GRASS CUTTER.
(Application filed Aug. 6, 1898.)
(No Model.) 2 Sheets—Sheet 1.
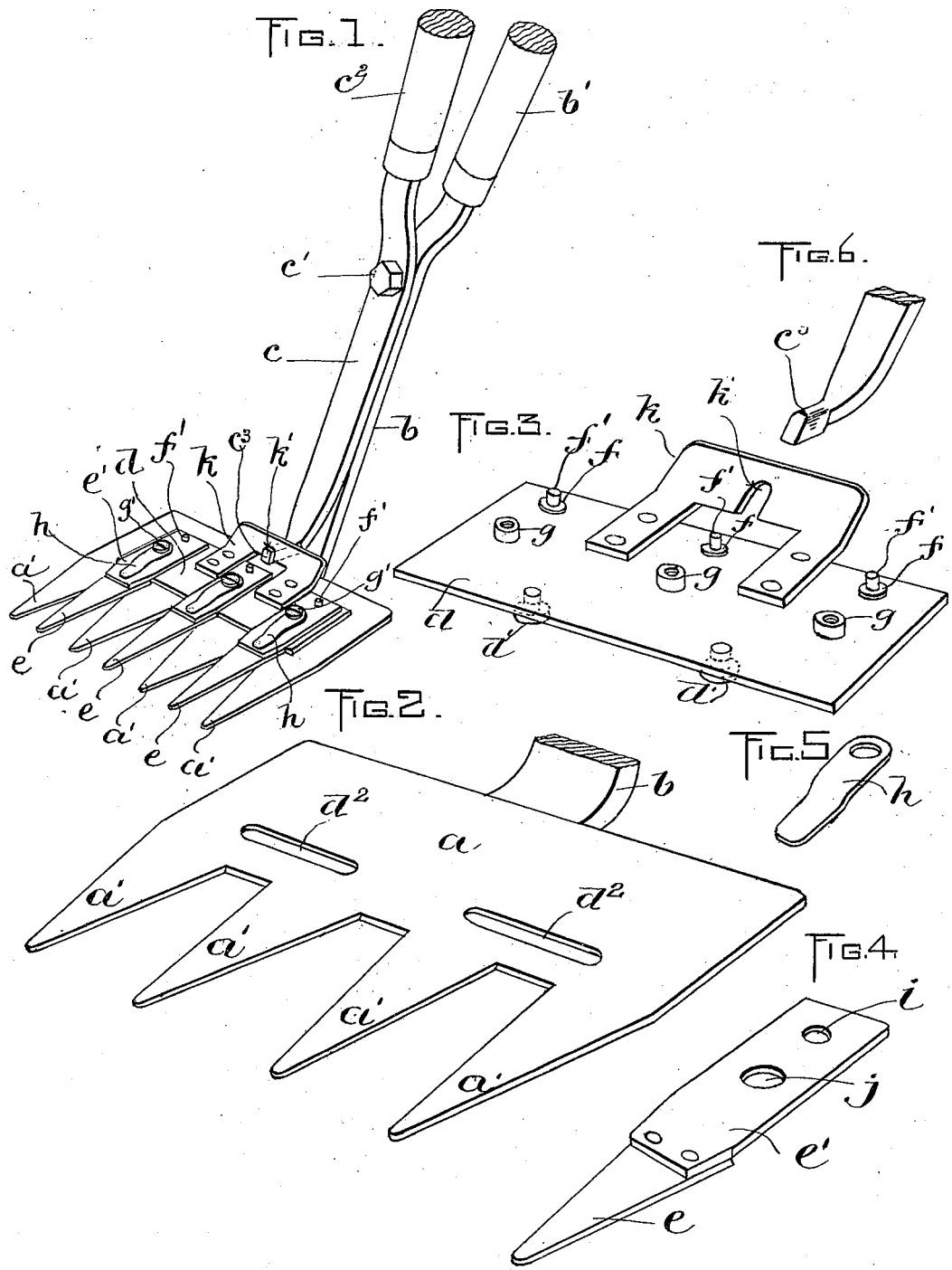

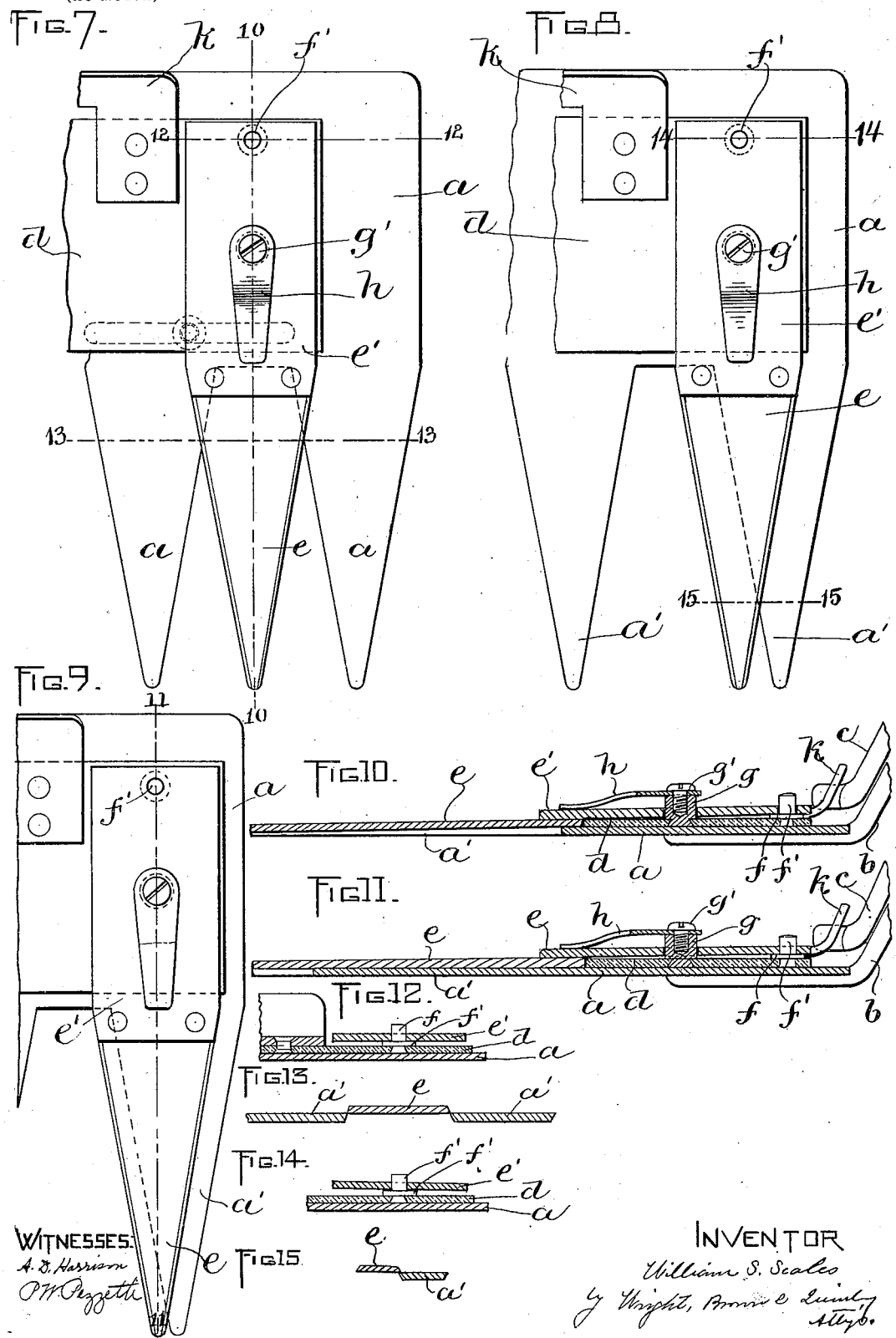

UNITED STATES PATENT OFFICE.

WILLIAM S. SCALES, OF EVERETT, MASSACHUSETTS, ASSIGNOR TO CHARLES F. BROWN, TRUSTEE, OF READING, MASSACHUSETTS.

GRASS-CUTTER.

SPECIFICATION forming part of Letters Patent No. 639,619, dated December 19, 1899.

Application filed August 6, 1898. Serial No. 687,927. (No model.)

*To all whom it may concern:*

Be it known that I, WILLIAM S. SCALES, of Everett, in the county of Middlesex and State of Massachusetts, have invented certain new and useful Improvements in Grass-Cutters, of which the following is a specification.

This invention has for its object to provide a simple, convenient, and effective grass-cutter adapted particularly for use in trimming borders and other places that are inaccessible to an ordinary lawn-mower.

The invention consists in the improvements which I will now proceed to describe and claim.

Of the accompanying drawings, forming a part of this specification, Figure 1 represents a perspective view of my improved cutter. Fig. 2 represents a perspective view of the base-plate with its fixed teeth. Fig. 3 represents a perspective view of the slide which is movable upon the base-plate. Fig. 4 represents a perspective view of one of the independent cutters mounted on the slide. Fig. 5 is a perspective view of one of the springs. Fig. 6 is a perspective view of the lower portion of the oscillating lever. Fig. 7 represents a plan view of a portion of the cutter, showing one of the movable teeth in its central position relatively to the two fixed teeth with which it coöperates. Figs. 8 and 9 are views similar to Fig. 7, showing the movable tooth in different positions. Fig. 10 represents a section on line 10 10, Fig. 7. Fig. 11 represents a section on line 11 11, Fig. 9. Fig. 12 represents a section on line 12 12, Fig. 7. Fig. 13 represents a section on line 13 13, Fig. 7. Fig. 14 represents a section on line 14 14, Fig. 8. Fig. 15 represents a section on line 15 15, Fig. 8.

In the drawings, $a$ represents a base-plate having a series of fixed cutters $a'$. The cutters and plate are preferably made in a single integral part and all in the same plane, the cutters having oblique outwardly-diverging cutting edges and being separated from each other by tapering or V-shaped recesses, as shown in Fig. 2. To the base-plate $a$ is affixed a handle or lever $b$, which extends upwardly and is inclined backwardly from the base-plate and is provided at its upper portion with a handle extension $b'$.

$c$ represents a lever which is fulcrumed at $c'$ to the lever $b$ and has a handle extension $c^2$ at its upper end, the lower end of the lever $c$ being provided with a lug or coupling member $c^3$, adapted to engage a coupling member on the slide, hereinafter referred to.

$d$ represents a slide, which is preferably a flat metal plate formed to rest upon the base-plate $a$ and to engage therewith, so as to have a limited reciprocating motion thereon, the means of engagement here shown being headed studs $d'$ $d'$, affixed to the slide and projecting from the under side thereof, and slots $d^2$ $d^2$ in the base-plate, through which the shanks of said studs pass, the heads of the studs being wider than the slots and located below the base-plate. On the slide $d$ are mounted independently a series of movable cutters $e$, each having outwardly-converging cutting edges. Each cutter is provided with a shank or holder $e'$, which may be made integral with the cutter or, as here shown, as a separate piece riveted to the cutter. (See Fig. 4.) The slide $d$ and cutters $e$ have provisions for holding the cutters $e$ yieldingly against the fixed cutters and for permitting the outer ends of the movable cutters to swing downwardly, so that when they occupy the position shown in Fig. 7 their outer ends will be below the upper surfaces of the fixed cutters, as shown in Fig. 10. The slide and the movable cutters also have provisions for permitting the movable cutters to tip laterally, so that one edge can sink below the other, as shown in Figs. 14 and 15. These provisions enable the movable cutters to continuously maintain operative shearing contact with the fixed cutters at any position occupied by the movable cutters. When a movable cutter is midway between two fixed cutters, as shown in Fig. 7, it occupies a horizontal position, as shown in Figs. 12 and 13. As the movable cutter moves from the position shown in Fig. 7 its advancing edge is held in close shearing contact with the corresponding edge of the fixed cutter, and gradually and as the point of intersection of the two edges moves outwardly toward the outer ends of the cutters the outer end of the movable cutter swings upwardly and its advancing edge rises, its rear edge remaining depressed until the movable cutter completes its stroke, as shown in Fig. 9, when the two cutters will be substantially parallel. Figs. 14 and 15 show the lateral inclination of the movable cutter and its shank or holder when the said cutter is in the position shown in Fig. 8.

The means whereby the described movements of the movable cutter are permitted, are as follows: The slide $d$ is provided with a series of raised bearings $f$ near its rear edge, one for each cutter $e$, and studs $f'$, rising from said bearings, the studs being of lesser diameter than said bearings. Larger studs $g$ rise from the slide $d$ adjacent to the bearings $f$, these studs being tapped to receive screws $g'$, which secure springs $h$ to the studs $g$. The free ends of the springs $h$ bear upon the outer portions of the shanks or holders $e'$, and thus exert continual downward pressure upon the cutters $e$. Each shank $e'$ is provided with an orifice $i$ near its rear end, formed to receive one of the studs $f'$, and another orifice $j$, formed and arranged to receive one of the studs $g$. The orifices $i$ and $j$ fit the studs $f'$ and $g$ somewhat loosely, so that the shanks or holders $e'$ and cutters $e$ can tip both longitudinally and laterally, as indicated in Figs. 10, 11, 14, and 15.

It will be seen that the studs $f'$ and $g$ in connection with the springs $h$ retain the cutter-holders $e'$ and cutters $e$ in their operative positions, besides permitting the tipping motions above described.

The slide $d$ is provided with a suitable coupling member adapted to engage the lever $c$, so that when said lever is oscillated the slide $d$ will be reciprocated on the base-plate. I have here shown the coupling member on the slide made in the form of an ear $k$, riveted to the slide and bent upwardly at the rear edge of the slide and provided with a slot $k'$, adapted to receive the lug $c^3$. The lug or coupling member $c^3$ has a loose or sliding fit in the slot $k'$, provision being thus made for imparting a reciprocating movement to the slide $d$ by the oscillating movement of the lever $c$.

I do not limit myself to the details of construction here shown and described, as the same may be variously modified without departing from the spirit of my invention.

It is obvious that my invention may be embodied in an apparatus having two fixed cutters $a'$ and a single movable cutter $e$, the latter having the longitudinal and lateral tipping movements above described. In other words, the plate $a$ may have but two cutters $a'$, and the slide $d$ but one cutter $e$, my invention being characterized by two fixed cutters $a'$ $a'$, having outwardly-diverging cutting edges forming a V-shaped recess, a movable cutter $e$, having outwardly-converging cutting edges, and provisions for continuously maintaining both cutting edges of the movable cutter in operative engagement with the diverging edges of the fixed cutters.

I call attention to the mechanism for reciprocating the movable cutters, for by its employment I am able to greatly reduce the weight of the machine and to conveniently operate it.

The base-plate may lie substantially or approximately at a right angle to the handle or lever $b$, since the handle or lever $c$ is pivoted to the said handle $b$ above the base-plate, (the axis of the pivot being either parallel to the base-plate or at a slight inclination thereto,) and is connected with the movable slide by a coupling having a loose or sliding connection with said slide. This is a great improvement over cutters in which one lever is pivoted to the base-plate, for in such cases the handles must be at such an obtuse angle to the base-plate as to be nearly parallel therewith, and the parts must be very much larger and heavier.

Where I have used the term "base-plate," I desire to have it construed as a means for receiving and supporting the stationary cutters, and it may be above or below the slide.

Having thus explained the nature of my invention and described a way of constructing and using the same, although without having attempted to set forth all the forms in which it may be made or all the modes of its use, I declare that what I claim is—

1. A grass-cutter comprising a base-plate having fixed cutters, a slide movable thereon, and a series of independent movable cutters mounted on the slide and yieldingly held against the fixed cutters, each movable cutter having provisions for pressing it independently and yieldingly into the space between the adjacent fixed cutters.

2. A grass-cutter comprising a base-plate having fixed cutters, a slide movable thereon, and a movable cutter mounted on the slide and held yieldingly against the fixed cutters, the said slide and movable cutter having provisions for permitting the depression of the outer portion of the movable cutter into the space between the fixed cutters.

3. A grass-cutter comprising a base-plate having fixed cutters, a slide movable thereon, and a movable cutter mounted on the slide and held yieldingly against the fixed cutters, the said slide and movable cutter having provisions for permitting the depression of the outer portion of the movable cutter and a lateral rocking movement of the said cutter.

4. A grass-cutter comprising a base-plate having fixed cutters, a slide movable on the base-plate and provided with a raised bearing and a spring-holding stud, a cutter having a shank or holder engaged with the said bearing, stud, and spring, and means for reciprocating the slide on the base-plate.

5. A grass-cutter comprising a base-plate having a series of fixed cutters and a fixed handle or lever, a movable handle or lever fulcrumed on the fixed lever, a slide engaged with the base-plate and movable thereon, said slide being provided with a coupling member adapted to engage the movable lever, a plurality of movable cutters each mounted independently on the slide, and springs engaging and holding the movable cutters against the fixed cutters, the said movable cutters and slide having provisions for permitting longitudinal and lateral swinging or tipping movements of the movable cutters.

In testimony whereof I have affixed my signature in presence of two witnesses.

WILLIAM S. SCALES.

Witnesses:
A. D. HARRISON,
P. W. PEZZETTI.